(12) United States Patent
Zhang et al.

(10) Patent No.: US 11,671,370 B2
(45) Date of Patent: Jun. 6, 2023

(54) METHOD AND APPARATUS FOR ADJUSTING NETWORK FLOW

(71) Applicant: Baidu Online Network Technology (Beijing) Co., Ltd., Beijing (CN)

(72) Inventors: Anzhan Zhang, Beijing (CN); Jingying Qu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 42 days.

(21) Appl. No.: 17/345,601

(22) Filed: Jun. 11, 2021

(65) Prior Publication Data

US 2021/0306269 A1  Sep. 30, 2021

(30) Foreign Application Priority Data

Dec. 15, 2020 (CN) .......................... 202011481133.7

(51) Int. Cl.
*H04L 47/122* (2022.01)
*H04L 47/34* (2022.01)
*H04L 47/74* (2022.01)

(52) U.S. Cl.
CPC ............ *H04L 47/122* (2013.01); *H04L 47/34* (2013.01); *H04L 47/746* (2013.01)

(58) Field of Classification Search
CPC ..... H04L 47/122; H04L 47/34; H04L 47/746; H04L 41/5022; H04L 45/127; H04L 47/35; H04L 47/2433; H04L 67/10
See application file for complete search history.

(56) References Cited

U.S. PATENT DOCUMENTS

2015/0236959 A1* 8/2015 Cai ..................... H04L 47/24
                                                              709/235
2020/0145308 A1   5/2020 Al Ramady et al.

FOREIGN PATENT DOCUMENTS

| CN | 105246102 A | * | 1/2016 |
| CN | 106506817 A | | 3/2017 |
| CN | 108173698 A | | 6/2018 |
| CN | 109756426 A | | 5/2019 |
| CN | 110958137 A | | 4/2020 |
| EP | 2 015 527 A1 | | 1/2009 |
| WO | 2020/158444 A1 | | 8/2020 |

* cited by examiner

*Primary Examiner* — Yaotang Wang
(74) *Attorney, Agent, or Firm* — Seed IP Law Group LLP (57) ABSTRACT

A method and apparatus for adjusting network flow are provided. An embodiment of the method may include: in response to the server meeting a network flow adjustment condition, acquiring network flow-related information of the server; determining network flow adjustment operations based on the network flow-related information, wherein the network flow adjustment operations indicate to determine at least one level of downlink flow from a plurality of levels of downlink flows according to an ascending order of the plurality of levels of downlink flows, to perform network flow downregulation on the determined at least one level of downlink flow, the at least one level not comprising a highest level in the plurality of levels, and in any two levels of downlink flows, a value of a downlink flow of a higher level being greater than a value of a downlink flow of a lower lever; and performing, according to a sequential order of operations in the network flow adjustment operations, at least one operation in the network flow adjustment operations.

17 Claims, 5 Drawing Sheets

METHOD AND APPARATUS FOR ADJUSTING NETWORK FLOW

CROSS-REFERENCE TO RELATED APPLICATIONS

This application claims priority to Chinese Patent Application No. 202011481133.7, filed with the China National Intellectual Property Administration (CNIPA) on Dec. 15, 2020, the content of which is incorporated herein by reference in its entirety.

TECHNICAL FIELD

The present disclosure relates to the field of computer technology, in particular to the field of cloud computing technology, and more particular to a method and apparatus for adjusting network flow.

BACKGROUND

With the development of Internet technology, various Internet products have gradually become user's daily necessities, affecting all aspects of user's lives.

Meanwhile, with the number of users increasing, pressure on the cloud is also increasing. In particular, short-term network flow peaks may occur, and then many problems such as cloud server overload will occur. In the event of a failure, an emergency response strategy is required to ensure the smooth progress of a transaction.

SUMMARY

A method, apparatus, electronic device and storage medium for adjusting network flow are provided.

According to a first aspect, some embodiments of the present disclosure provide a method for adjusting network flow, applied to a server, the method includes: in response to the server meeting a network flow adjustment condition, acquiring network flow-related information of the server; determining network flow adjustment operations based on the network flow-related information, wherein the network flow adjustment operations indicate to determine at least one level of downlink flow from a plurality of levels of downlink flows according to an ascending order of the plurality of levels of downlink flows, to perform network flow downregulation on the determined at least one level of downlink flow, the at least one level not comprising a highest level in the plurality of levels, and in any two levels of downlink flows, a value of a downlink flow of a higher level being greater than a value of a downlink flow of a lower lever; and performing, according to a sequential order of operations in the network flow adjustment operations, at least one operation in the network flow adjustment operations.

According to a second aspect, some embodiments of the present disclosure provide an apparatus for adjusting network flow, for a server, the apparatus includes: an acquisition unit, configured to acquire, in response to the server meeting a network flow adjustment condition, network flow-related information of the server; a determination unit, configured to determine network flow adjustment operations based on the network flow-related information, wherein the network flow adjustment operations indicate to determine at least one level of downlink flow from a plurality of levels of downlink flows according to an ascending order of the plurality of levels of downlink flows, to perform network flow downregulation on the determined at least one level of downlink flow, the at least one level not comprising a highest level in the plurality of levels, and in any two levels of downlink flows, a value of a downlink flow of a higher level being greater than a value of a downlink flow of a lower lever; and a performing unit, configured to perform, according to a sequential order of operations in the network flow adjustment operations, at least one operation in the network flow adjustment operations.

According to a third aspect, some embodiments of the present disclosure provide an electronic device, the electronic device includes one or more processors; and a storage apparatus, for storing one or more programs, the one or more programs, when executed by the one or more processors, cause the one or more processors to implement the method according to the first aspect.

According to a fourth aspect, some embodiments of the present disclosure provide a computer readable storage medium, storing a computer program thereon, the program, when executed by a processor, cause the processor to implement the method according to the first aspect.

According to a fifth aspect, some embodiments of the present disclosure provide a computer program product, comprising a computer program, the computer program, when executed by a processor, causes the processor to implement the method according to the first aspect.

BRIEF DESCRIPTION OF THE DRAWINGS

By reading detailed description of non-limiting embodiments with reference to the following accompanying drawings, other features, objectives and advantages of the present disclosure will become more apparent.

DETAILED DESCRIPTION OF EMBODIMENTS

The following describes exemplary embodiments of the present disclosure with reference to the accompanying drawings, which include various details of embodiments of the present disclosure to facilitate understanding, and should be regarded as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

It should be noted that the embodiments and features in embodiments in the present disclosure may be combined with each other on a non-conflict basis. Hereinafter, embodiments of the present disclosure will be described in detail with reference to the accompanying drawings and in conjunction with the embodiments.

FIG. 1 shows an exemplary system architecture 100 to which a method for adjusting network flow or an apparatus for adjusting network flow may be implemented.

Figure 1:
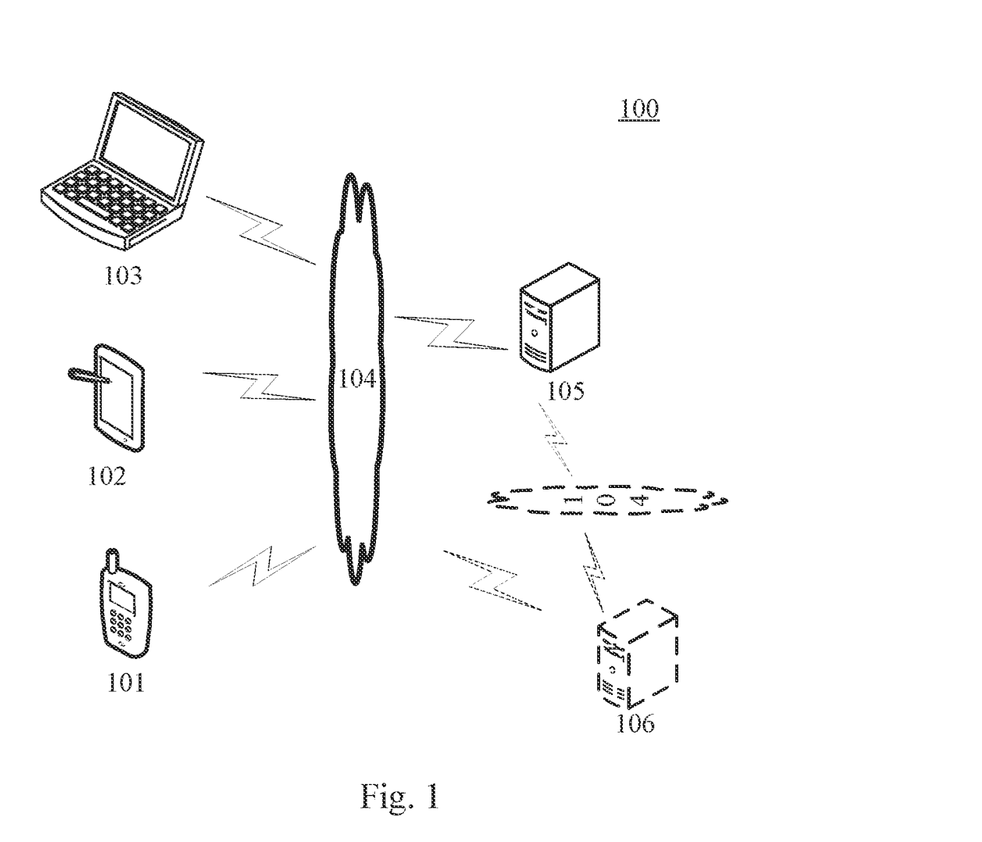
FIG. 1 is an exemplary system architecture diagram to which some embodiment of the present disclosure may be implemented.

As shown in FIG. 1, the system architecture 100 includes terminal device(s) 101, 102, and/or 103, a network 104 and a server 105, and may also include a server 106. The network 104 is used to provide a communication link medium between the terminal device(s) 101, 102, and/or 103 and the servers 105, 106. The network 104 may include various types of connections, such as wired, wireless communication links, or optical fibers.

A user may use the terminal device(s) 101, 102, and/or 103 to interact with the servers 105, 106 through the network 104 to receive or send messages, and so on. Various communication client applications, such as video applications, live stream applications, instant messaging tools, email clients, and social platform software, may be installed on the terminal device(s) 101, 102, and/or 103.

The terminal device(s) 101, 102, and/or 103 here may be hardware or software. When the terminal device(s) 101, 102, and/or 103 are hardware, they may be various electronic devices having display screens, including but not limited to smart phones, tablet computers, e-book readers, laptop computers, desktop computers, and so on. When the terminal device(s) 101, 102, and/or 103 are software, they may be installed in the electronic devices listed above. They may be implemented as a plurality of software or software modules (for example, a plurality of software or software modules used to provide distributed services), or as a single software or software module, which is not limited herein.

The server 105 may be a server that provides various services, for example, a backend server that provides support for the terminal device(s) 101, 102, and/or 103. The backend server may process such as analyze received data such as network flow-related information, and feed back a processing result (for example, a result of performing network flow adjustment operations) to the terminal devices. The server 106 may refer to a preset redundant server. The redundant server may be configured to perform service expansion on the server 105, that is, provide a new operating resource for service expansion of the server 105.

It should be noted that the method for adjusting network flow provided in embodiments of the present disclosure may be performed by the server 105, and accordingly, the apparatus for adjusting network flow may be provided in the server 105, or the terminal device(s) 101, 102, and/or 103.

It should be understood that the numbers of terminal devices, networks, and servers in FIG. 1 are merely illustrative. Depending on the implementation needs, there may be any number of terminal devices, networks, and servers.

Figure 2:
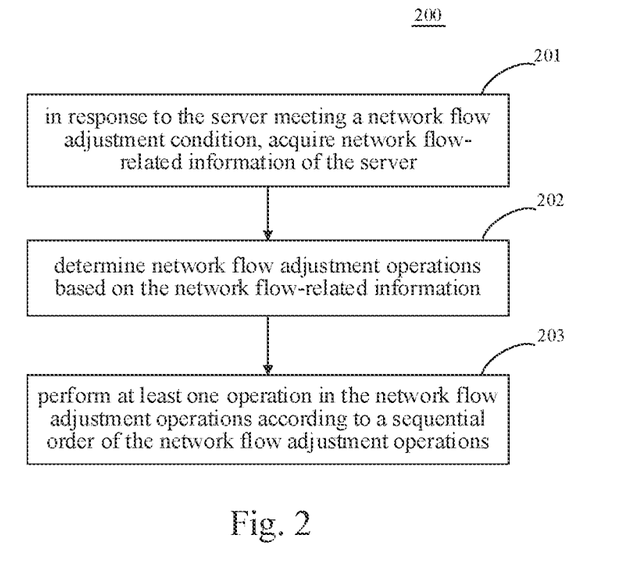
FIG. 2 is a flowchart of a method for adjusting network flow according to an embodiment of the present disclosure.

With further reference to FIG. 2, illustrating a flow 200 of a method for adjusting network flow according to an embodiment of the present disclosure. The method for adjusting network flow may be used for a server, and the method may include:

Step 201, in response to the server meeting a network flow adjustment condition, acquiring network flow-related information of the server.

In the present embodiment, an executing body (for example, the server shown in FIG. 1) on which the method for adjusting network flow operates may acquire the network flow-related information of the server when the server meets the network flow adjustment condition. The network flow of the server may be adjusted only when the network flow adjustment condition is met. For example, the network flow adjustment condition may refer to that a flow rate reaches a preset flow rate, where the flow rate may be amount of data per second. The server here may be one server or a server cluster composed of at least two servers.

The network flow-related information is used to determine network flow adjustment operations, and may refer to various information related to the network flow. For example, the network flow-related information may include a speed of feedback on the upstream network flow (network flow generated upon a request).

Step 202, determining network flow adjustment operations based on the network flow-related information, wherein the network flow adjustment operations indicate to determine at least one level of downlink flow from a plurality of levels of downlink flows according to an ascending order of the plurality of levels of the downlink flows, to perform network flow downregulation on the determined at least one level of downlink flow, the at least one level not including a highest level in the plurality of levels, and in any two levels of downlink flows, a value of a downlink flow of a higher level being greater than a value of a downlink flow of a lower lever.

In the present embodiment, the executing body may determine the network flow adjustment operations including network flow downregulation based on the network flow-related information. That is, the network flow adjustment operations indicate to perform network flow downregulation, and the network flow downregulation here refers to a downregulation targeting at a downlink flow. In addition, the downlink flows of the server may be classified into different levels, and the executing body may perform network flow downregulation on at least one level of downlink flow in these levels. The downlink flow subject to the downregulation herein includes downlink flow of the lowest level, and does not include the downlink flow of the highest level. The network flow downregulation herein may include reducing part of the network flow of a certain level, or may include removing all the network flow of a certain level.

The various levels of downlink flow herein may include downlink flow for a user request. For example, the user request instructs to query the weather, and the downlink flow for the request may include a plurality of levels of downlink flows. For example, the downlink flow of a highest level P0 includes detailed weather information (such as including weather-related colors, specific effects), and the downlink flow of a next-highest level P1 includes a text description of the weather in an application. The downlink flow of a lowest level P2 includes a chat record of two friends about the weather on a public platform.

The higher the level of the downlink flow, the higher the value of the downlink flow. The value may be determined by various value factors. For example, the value factor may include at least one of: relevance to a user request, authority, timeliness, and user historical click probability. For example, the executing body or other electronic device may weight each value factor of a level of downlink flow, and determine a value of the level of downlink flow using a weighted result. The downlink flow refers to network flow generated when data is delivered from the server to the user's terminal.

Step 203, performing at least one operation in the network flow adjustment operations according to a sequential order of the network flow adjustment operations.

In the present embodiment, the executing body may perform at least one operation in the network flow adjustment operations according to the sequential order of the operations in the determined network flow adjustment operations. In practice, the executing body may perform the at least one operation in the network flow adjustment operations using various methods, for example, performing all of the network flow adjustment operations according to the sequential order. Alternatively, the executing body may execute the network flow adjustment operations within a preset period, and after reaching the preset period, no matter which operation is executed, the execution will stop.

Alternatively, the server may further include a disaster recovery cache area and a performance cache area. In the case of an increase in a negative response value, the executing body may acquire cached data from the disaster recovery cache area and/or the performance cache area, and use the cached data for response processing. The disaster recovery cache area stores data used to reply to a request, such as historical reply data. The performance cache area is used to speed up the response.

The method provided in the above embodiment of the present disclosure may perform network flow downregulation for at least one level of downlink flow including the lowest level, thus may effectively ensure a smooth delivery of high-level network flow, and present the user with high-value delivered content.

In some alternative implementations of the present embodiment, step 202 may include: switching, in response to the network flow adjustment condition met by the server being that a negative response value to a terminal is increased to a target value, the network flow service of the server to a redundant server, where the negative response value indicates non-response to a request or a response delay to a request; and determining the network flow adjustment operations based on the network flow-related information, in response to the network flow service switched to the redundant server not reaching a normal status.

In these alternative implementations, the executing body may switch the network flow service of the server to the redundant server, when the network flow adjustment condition met by the server is that the negative response value to the terminal is increased to the target value. In addition, after the switch, if the redundant server still cannot support the network flow service, the executing body may determine the network flow adjustment operations to cause the network flow service to be normal through the network flow adjustment operations. The redundant server here may be at least one server that is preset and different from the executing body.

A negative response may be understood as an abnormality or failure of the service. The above negative response value may refer to the number of negative responses, a probability of a negative response, an increase amount in negative response, or an increase rate of negative response. The negative response here may refer to non-response or a response delay to the user request. In practice, the negative response value is increased to the target value may refer to a substantial increase, for example, the increase amount is greater than a preset increase amount or the increase rate is greater than a preset increase rate. For example, if a probability of non-responding to the user request rises from one percent to five percent, the executing body may determine that the network flow adjustment condition is met.

The normal status here is a status preset for the network flow service. For example, the normal status may include the probability of a negative response being one percent, and a probability of a response delay being one percent.

These implementations may first switch the service to another server when the service is abnormal, so as to achieve the most efficient and effective emergency response, and try to handle an abnormal situation of the service without degrading any network flow.

In some alternative implementations of the present embodiment, the in response to the server meeting a network flow adjustment condition in step 201, may include: determining, in response to determining that there is a future rush network flow period, that the server meets the network flow adjustment condition; where, the network flow adjustment operations are used to be performed in the future rush network flow period, the network flow-related information includes a determination factor of the network flow adjustment operations, and the determination factor includes at least one of: a capacity demand of a network flow and a level of a downlink flow.

In these alternative implementations, the network flow adjustment condition may be that the executing body determines that there is the future rush network flow period. Rush network flow refers to the server's network flow when the network flow peaks, and the network flow peak may refer to that the flow rate of the network flow is greater than a preset flow rate threshold. The future rush network flow period here may be set by users of terminals (such as terminals of those skilled in the art), or obtained by the executing body using a preset model.

The network flow peak in the future rush network flow period here may be a short-term network flow peak generated by operating activities of a network platform. In this scenario, the executing body may use the determination factor of the network flow adjustment operations to determine the network flow adjustment operations. The determination factor may include the flow capacity demand, and may also include the level of the downlink flow. The flow capacity demand herein may indicate a capacity demand of the network flow set for the future rush network flow period. The capacity demand may be generated by the executing body using a designated model, or may be obtained from terminals (such as terminals of a technician).

In practice, the executing body may determine the network flow adjustment operations based on the capacity demand of a network flow and the level of the downlink flow using various methods. For example, the executing body may acquire a corresponding relationship, which indicates corresponding relationship between the above capacity demand, the level of the downlink flow, and the network flow adjustment operations. In this way, the executing body may find the network flow adjustment operations corresponding to the capacity demand of the network flow of the server and the level of the downlink flow.

Alternatively, the executing body may input the capacity demand of network flow of the server and the level of the downlink flow into a designated model (such as a trained deep neural network), and obtain the network flow adjustment operations output by the model.

These implementations may determine that the network flow adjustment condition is met when a network flow peak is predicted in the future, so that implementable network flow adjustment operations may be determined for the network flow peak period to ensure that the server may smoothly provide services during the period.

In some alternative implementations of the present embodiment, the network flow-related information includes service status information; and step 202 may include: determining, in response to the network flow adjustment condition met by the server being an increase in the negative response value to the terminal, failure cause corresponding to the service status information; and determining the network flow adjustment operations based on the failure cause.

In these alternative implementations, the executing body may determine the failure cause in the case of a failure of the server, and the failure cause is used to indicate a failure cause of the server. Then, the executing body may determine the network flow adjustment operations based on the failure cause. The service status information may be all kinds of information reflecting current status of services related to the network flow. For example, the service status information may be a running status of each service instance node.

In practice, the executing body may determine the failure cause using various methods. For example, the executing body may acquire a corresponding relationship between the service status information and the failure cause, and search for the failure cause corresponding to the service status information in the corresponding relationship. Alternatively, the executing body may also send the service status information to a designated terminal (such as a terminal of those skilled in the art), and acquire the failure cause returned by the terminal.

In practice, the executing body may determine the network flow adjustment operations based on the failure cause using various methods. For example, the executing body may acquire a mapping relationship between the failure cause and the network flow adjustment operations, and search for the network flow adjustment operations corresponding to the failure cause in the mapping relationship. Alternatively, the executing body may input the failure cause into a target model, and the target model is used to predict the network flow adjustment operations corresponding to the failure cause. In this way, the executing body may obtain the network flow adjustment operations output from the target model.

These implementations may directly determine the matching network flow adjustment operations for the failure cause by analyzing the failure cause of the server, thereby improving an accuracy of determining the network flow adjustment operations.

In some alternative implementations of the present embodiment, in the at least one level of downlink flow, each level of downlink flow has a corresponding downregulation range, and a downregulation range of any level of network flow is greater than or equal to a downregulation range of network flow of a level higher than the any level.

In these alternative implementations, the downregulation range of a level of network flow is greater than or equal to the downregulation range of network flow of a higher level. For example, removing all network flow of the lowest level and reducing part of the network flow of a next lowest level.

These implementations may prioritize a smooth delivery of high-value network flow.

Figure 3:
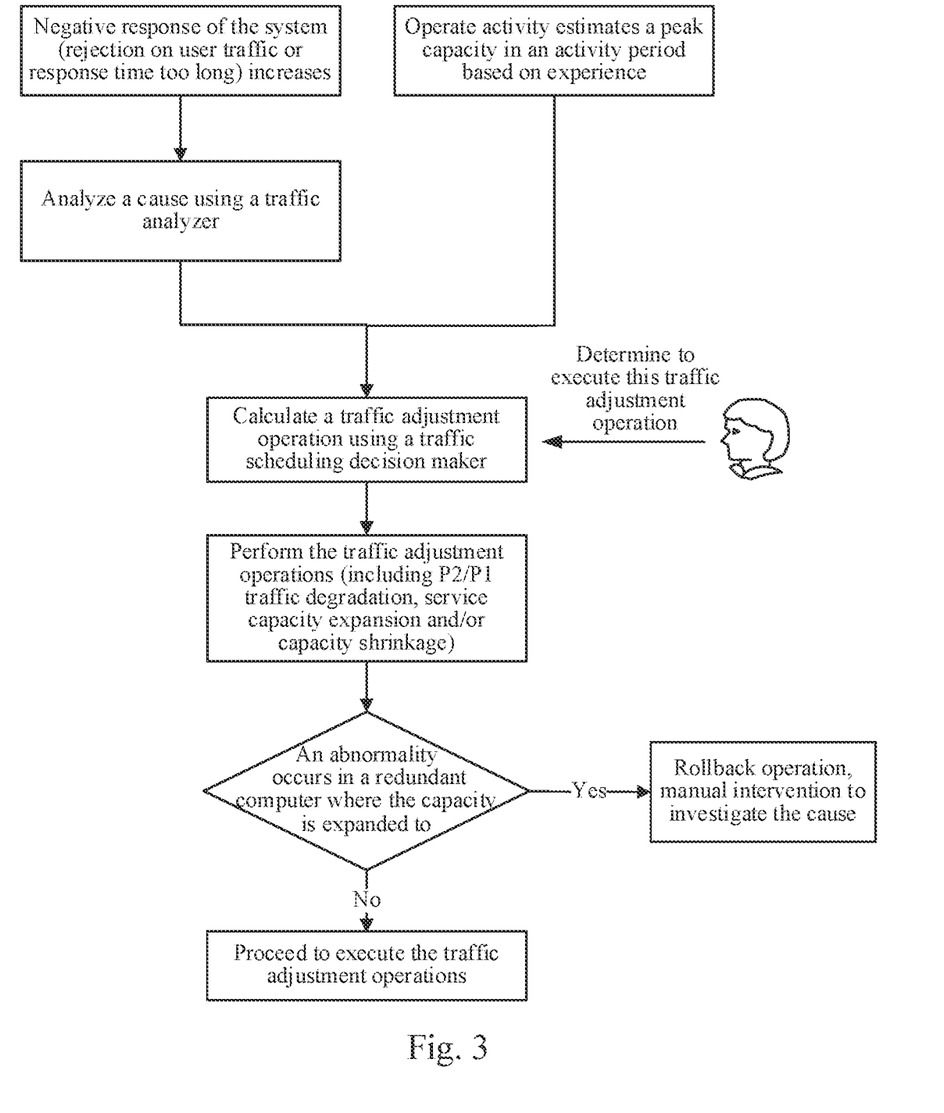
FIG. 3 is a flowchart of the method for adjusting network flow according to another embodiment of the present disclosure.

With further reference to FIG. 3, FIG. 3 is a flowchart of a method for adjusting network flow according to another embodiment of the present disclosure.

Figure 4:
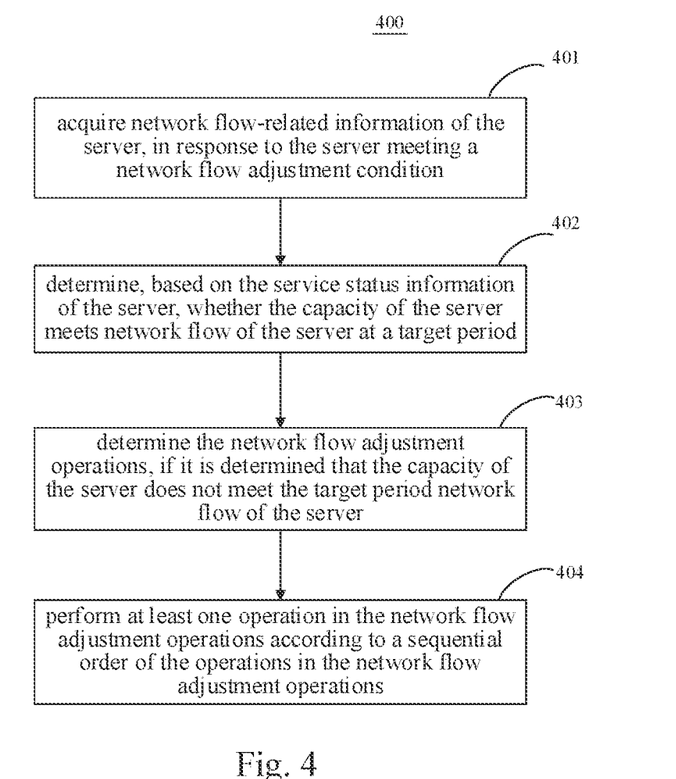
FIG. 4 is a flowchart of the method for adjusting network flow according to another embodiment of the present disclosure.

With further reference to FIG. 4, illustrating a flow 400 of a method for adjusting network flow. In the flow 400, the network flow adjustment operations further instruct to adjust a service capacity of more than one level of downlink flow of the server, and the network flow-related information includes service status information. The method includes the following steps:

Step 401, acquiring network flow-related information of the server, in response to the server meeting a network flow adjustment condition.

In the present embodiment, an executing body (for example, the server shown in FIG. 1) on which the method for adjusting network flow operates may acquire the network flow-related information of the server when the server meets the network flow adjustment condition. The network flow adjustment condition may refer to a condition that needs to be met to adjust the network flow. For example, the network flow adjustment condition may refer to that a flow rate reaches a preset flow rate, where the flow rate may be amount of data per second. The server here may be one server or a server cluster composed of at least two servers.

Step 402, determining, based on the service status information of the server, whether the capacity of the server meets network flow of the server at a target period, where the network flow at the target period is a current network flow or network flow in a future rush network flow period, the network flow adjustment operations instructs to determine at least one level of downlink flow from a plurality of levels of downlink flows according to an ascending order of the plurality of levels of downlink flows, to perform network flow downregulation on the determined at least one level of downlink flow, the at least one level not including the highest level in the plurality of levels, and in any two levels of downlink flows, a value of a higher level downlink flow being greater than a value of a lower level downlink flow.

In the present embodiment, the executing body may determine whether the capacity of the server meets the network flow of the server at the target period, based on the service status information of the server.

In practice, if the service status information shows that the currently provided service is normal, it may be determined that the capacity of the server meets the current network flow. Alternatively, the executing body may also compare the current network flow with a predicted network flow in the future rush network flow period. For example, the executing body may determine a difference between the predicted network flow in the future rush network flow period and the current network flow, and determine whether a current idle resource of the server meets the difference based on a preset corresponding relationship table, a model or a designated terminal. If a current idle resource of the server does not meet the difference, the executing body may determine that the capacity of the server does not meet the target period network flow of the server.

Step 403, determining the network flow adjustment operations, if it is determined that the capacity of the server does not meet the target period network flow of the server.

In the present embodiment, if it is determined that the capacity of the server does not meet the current network flow of the server, the executing body may determine the network flow adjustment operations, which include performing service capacity adjustment on more than one level of downlink flow of the server.

The service capacity adjustment here may be implemented using various methods, such as service expansion for all levels of downlink flows, or service scaling for the lowest level of network flow. The service expansion and service scaling here may be performed for service instances in the service.

Step 404, performing at least one operation in the network flow adjustment operations according to a sequential order of the operations in the network flow adjustment operations.

In the present embodiment, the executing body may perform the at least one operation in the network flow adjustment operations according to the sequential order of the operations in the determined network flow adjustment operations. In practice, the executing body may perform the at least one operation in the network flow adjustment operations using various methods, for example, performing all the operations in the network flow adjustment operations according to the order. Alternatively, the executing body may perform the network flow adjustment operations within a preset period, and after reaching the preset period, no matter which operation is executed, the execution will stop.

In the present embodiment, when it is determined that the capacity of the server is insufficient, the capacity of the downlink flow may be adjusted to ensure a smooth delivery of the network flow.

In some alternative implementations of the present embodiment, the more than one level of network flow includes the highest level of network flow; the adjusting a service capacity of more than one level of downlink flow of the server, includes: determining, according to a descending order of the levels of the downlink flows, a first preset number of levels of downlink flows from the plurality of levels of downlink flows to perform service capacity expansion, so as to add a new operating resource for processing the first preset number of levels of downlink flows, where the first preset number is less than or equal to the number of levels in the more than one level.

In these alternative implementations, the executing body may perform service expansion on the first preset number of levels of downlink flows of the server according to the descending order of the downlink flows, so as to increase generation and delivery of the first preset number of levels of downlink flows. In this way, more operating resources (such as space occupied by operation, memory) on this device or other device may be used to implement a smooth delivery of the first preset number of levels of downlink flows. The first preset number of levels involved in the service expansion here may be all of the above more than one level, or only a part of the more than one level.

The service capacity expansion here may only target at the downlink flow of the highest level, or may also target at other levels of downlink flows, for example, it may target at all the levels of downlink flows.

These implementations may perform service capacity expansion on downlink flow of high level of the server, which may ensure a smooth delivery of high-value network flow.

In some alternative implementations of the present embodiment, the adjusting a service capacity of more than one level of downlink flow of the server, may also include: determining, according to an ascending order of the levels of the downlink flows, a second preset number of levels of downlink flows from the plurality of levels of downlink flows to perform service capacity shrinkage on the determined second preset number of levels of downlink flows, so as to reduce an operating resource for processing the second preset number of levels of downlink flows.

In these alternative implementations, the executing body may also shrink capacities of the determined second preset number of levels of downlink flows of the server according to the ascending order of the levels of the downlink flows, so as to reduce generation and delivery of the second preset number of levels of downlink flows. The second preset number of levels do not include the highest level.

These implementations may perform service capacity shrinkage on the low-level downlink flow of the server, which may ensure the smooth delivery of high-value network flow.

In some alternative implementations of the present embodiment, step 204 may include: performing an operation of the network flow adjustment operations according to the sequential order of the operations in the network flow adjustment operations; and performing a rollback operation corresponding to the operation, in response to a negative response value of the new operating resource being increased to a target value.

In these alternative implementations, the executing body may be sequentially performed according to the sequential order of the operations. In addition, each time an operation is performed, the executing body may determine a performing effect of the operation, that is, determine whether the negative response value is increased to the target value. If it is determined that the negative response value is increased to the target value, the rollback operation, that is, a backspacing operation corresponding to the operation may be performed, in order to make the server return to a status where the operation is not performed.

These implementations may monitor the performing of the operations in real time, and roll back when the monitoring determines that one of the network flow adjustment operation is not performing well, to prevent a new failure.

Figure 5:
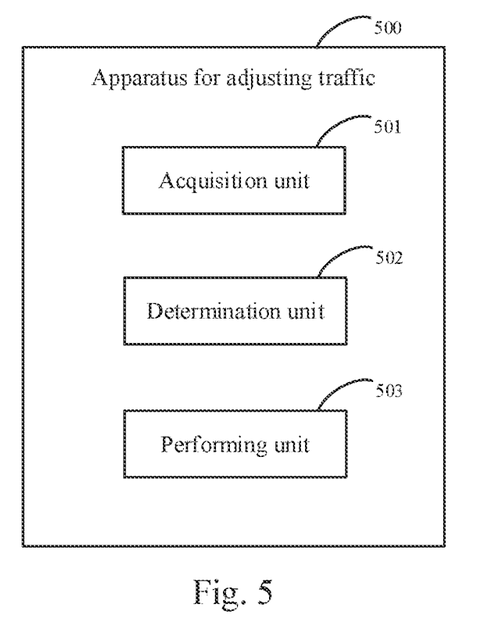
FIG. 5 is a schematic structural diagram of an apparatus for adjusting network flow according to an embodiment of the present disclosure.

With further reference to FIG. 5, as an implementation of the method shown in the above figures, an embodiment of the present disclosure provides an apparatus for adjusting network flow. The apparatus embodiment corresponds to the method embodiment shown in FIG. 2. In addition to the features described below, the apparatus embodiment may also include the same or corresponding features or effects as the method embodiment shown in FIG. 2. The apparatus may be applied to various electronic devices.

As shown in FIG. 5, an apparatus 500 for adjusting network flow of the present embodiment includes: an acquisition unit 501, a determination unit 502 and a performing unit 503. The acquisition unit 501 is configured to acquire, in response to the server meeting a network flow adjustment condition, network flow-related information of the server. The determination unit 502 is configured to determine network flow adjustment operations based on the network flow-related information, wherein the network flow adjustment operations indicate to determine at least one level of downlink flow from a plurality of levels of downlink flows according to an ascending order of the plurality of levels of downlink flows, to perform network flow downregulation on the determined at least one level of downlink flow, the at least one level not comprising a highest level in the plurality of levels, and in any two levels of downlink flows, a value of a downlink flow of a higher level being greater than a value of a downlink flow of a lower lever. The performing unit 503 is configured to perform, according to a sequential order of operations in the network flow adjustment operations, at least one operation in the network flow adjustment operations.

In the present embodiment, for the specific processing and the technical effects of the acquisition unit 501, the determination unit 502, and the performing unit 503 of the apparatus 500 for adjusting network flow, reference may be made to step 201, step 202, and step 203 in the corresponding embodiment in FIG. 2 respectively, and detailed description thereof will be omitted.

In some alternative implementations of the present embodiment, the determination unit is further configured to: in response to the network flow adjustment condition met by the server being that a negative response value to a terminal is increased to a target value, switch a network flow service of the server to a redundant server, wherein the negative response value indicates non-response to a request or a response delay to the request; and in response to determining that the network flow service switched to the redundant server does not reach a normal status, determine the network flow adjustment operations based on the network flow-related information.

In some alternative implementations of the present embodiment, the acquisition unit is further configured to: determine, in response to determining that there is a future rush network flow period, that the server meets the network flow adjustment condition; where, the network flow adjustment operations are used to be performed in the future rush network flow period, the network flow-related information comprises a determination factor of the network flow adjustment operations, and the determination factor comprises at least one of: a capacity demand of a network flow and a level of a downlink flow.

In some alternative implementations of the present embodiment, the network flow-related information includes service status information; the determination unit is further configured to: determine, in response to the network flow adjustment condition met by the server being an increase in the negative response value to the terminal, a failure cause corresponding to the service status information; and determine the network flow adjustment operations based on the failure cause.

In some alternative implementations of the present embodiment, the network flow adjustment operations further indicate to adjust a service capacity of more than one level of downlink flow of the server, and the network flow-related information comprises service status information; the determination unit is further configured to: determine, based on the service status information of the server, whether the capacity of the server meets network flow of the server at a target period, wherein the network flow at the target period is a current network flow or network flow in a future rush network flow period; and in response to determining that the capacity of the server does not meet the network flow of the server at the target period, determine the network flow adjustment operations.

In some alternative implementations of the present embodiment, the more than one level of network flow comprises the highest level of network flow; the adjusting a service capacity of more than one level of downlink flow of the server, includes: determining, according to a descending order of the plurality of levels of the downlink flows, a first preset number of levels of downlink flows from the plurality of levels of downlink flows to perform service capacity expansion on the determined first preset number of levels of downlink flows, so as to add new operating resource for processing the first preset number of levels of downlink flows, wherein the first preset number is less than or equal to a number of levels in the more than one level.

In some alternative implementations of the present embodiment, the adjusting the service capacity of more than one level of downlink flow of the server, also includes: determining, according to the ascending order of the plurality of levels of the downlink flows, a second preset number of levels of downlink flows from the plurality of levels of downlink flows to perform service capacity shrinkage on the determined second preset number of levels of downlink flows, so as to reduce an operating resource for processing the second preset number of levels of downlink flows.

In some alternative implementations of the present embodiment, the performing at least one operation in the network flow adjustment operations according to the sequential order of the operations in the network flow adjustment operations, includes: performing an operation in the network flow adjustment operations according to the sequential order of the operations in the network flow adjustment operations; and in response to a negative response value of the new operating resource being increased to a target value, performing a rollback operation corresponding to the operation in the network flow adjustment operations.

In some alternative implementations of the present embodiment, in the at least one level of downlink flow, each level of downlink flow has a corresponding downregulation range, and a downregulation range of any level of network flow is greater than or equal to a downregulation range of a higher level of network flow.

According to an embodiment of the present disclosure, an electronic device, a readable storage medium and a computer program product are provided.

Figure 6:
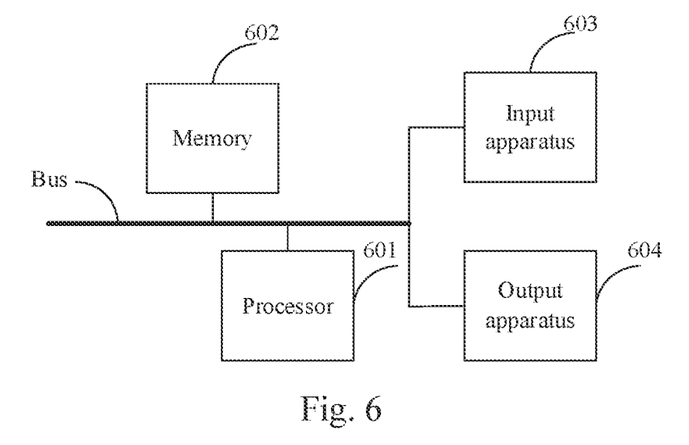
FIG. 6 is a block diagram of an electronic device used to implement the method for adjusting network flow according to an embodiment of the present disclosure.

As shown in FIG. 6, is a block diagram of an electronic device of the method for adjusting network flow according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by embodiments of the present disclosure. The memory stores instructions executable by at least one processor, so that the at least one processor performs the method for adjusting network flow provided by embodiments of the present disclosure. The non-transitory computer readable storage medium of the present disclosure stores computer instructions for causing a computer to perform the method for adjusting network flow provided by embodiments of the present disclosure.

The memory 602, as a non-transitory computer readable storage medium, may be used to store non-transitory software programs, non-transitory computer executable programs and modules, such as program instructions/modules corresponding to the method for adjusting network flow in embodiments of the present disclosure (for example, the acquisition unit 501, the determination unit 502 and the performing unit 503 as shown in FIG. 5). The processor 601 executes the non-transitory software programs, instructions, and modules stored in the memory 602 to execute various functional applications and data processing of the server, that is, to implement the method for adjusting network flow in the foregoing method embodiments.

The memory 602 may include a storage program area and a storage data area, where the storage program area may store an operating system and an application program required by at least one function; and the storage data area may store such as data created by the use of the electronic device for adjusting network flow. In addition, the memory 602 may include a high-speed random access memory, and may also include a non-transitory memory, such as at least one magnetic disk storage device, a flash memory or other non-transitory solid state storage devices. In some embodiments, the memory 602 may optionally include a memory disposed remotely relative to processor 601, which may be connected through a network to the electronic device for adjusting network flow. Examples of such networks include, but are not limited to, the Internet, enterprise intranets, local area networks, mobile communication networks and combinations thereof.

The electronic device for adjusting network flow may also include: an input apparatus 603 and an output apparatus 604. The processor 601, the memory 602, the input apparatus 603 and the output apparatus 604 may be connected through a bus or in other ways, and an example of the connection through a bus is shown in FIG. 6.

The input apparatus 603 may receive input digital or character information, and generate key signal inputs related to user settings and function control of the electronic device of the method for adjusting network flow, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other. The server may be a cloud server, also known as a cloud computing server or a cloud host, as a host product in the cloud computing service system for solving the problems such as difficult management and weak business scalability in the traditional physical host and VPS service ("Virtual Private Server", or "VPS" for short). The server may also be a server of a distributed system, or a server combined with a blockchain.

The flow charts and block diagrams in the accompanying drawings illustrate architectures, functions and operations that may be implemented according to the systems, methods and computer program products of various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure may be implemented by means of software or hardware. The described units or modules may also be provided in a processor, for example, described as: a processor, comprising an acquisition unit, a determination unit a performing unit, where the names of these units or modules do not in some cases constitute a limitation to such units or modules themselves. For example, the acquisition unit may also be described as "a unit for acquiring, in response to the server meeting a network flow adjustment condition, network flow-related information of the server."

In another aspect, some embodiments of the present disclosure further provides a computer-readable storage medium. The computer-readable storage medium may be the computer storage medium included in the apparatus in the above described embodiments, or a stand-alone computer-readable storage medium not assembled into the apparatus.

The computer-readable storage medium stores one or more programs. The one or more programs, when executed by a device, cause the device to: in response to the server meeting a network flow adjustment condition, acquiring network flow-related information of the server; determining network flow adjustment operations based on the network flow-related information, wherein the network flow adjustment operations indicate to determine at least one level of downlink flow from a plurality of levels of downlink flows according to an ascending order of the plurality of levels of downlink flows, to perform network flow downregulation on the determined at least one level of downlink flow, the at least one level not comprising a highest level in the plurality of levels, and in any two levels of downlink flows, a value of a downlink flow of a higher level being greater than a value of a downlink flow of a lower lever; and performing, according to a sequential order of operations in the network flow adjustment operations, at least one operation in the network flow adjustment operations.

The units involved in embodiments of the present disclosure may be implemented by means of software or hardware. The described units may also be provided in a processor, for example, may be described as: a processor including an acquisition unit, a determination unit and a performing unit. Here, the names of these units do not in some cases constitute limitations to such units themselves. For example, the acquisition unit may also be described as "a unit configured to acquire network flow-related information of the server, in response to the server meeting a network flow adjustment condition".

In another aspect, some embodiments of the present disclosure further provides a computer readable medium. The computer readable medium may be included in the apparatus in the above described embodiments, or a stand-alone computer readable medium not assembled into the apparatus. The computer readable medium carries one or more programs, the one or more programs, when executed by the apparatus, cause the apparatus to: acquire network flow-related information of the server, in response to the server meeting a network flow adjustment condition; determine network flow adjustment operations based on the network flow-related information, the network flow adjustment operation instructing to determine at least one level of downlink flow from a plurality of levels of downlink flow in an ascending order of level to perform network flow downregulation, the at least one level not including the highest level in the plurality of levels, and in any two levels of downlink flow, a value of a higher level downlink flow being greater than a value of a lower level downlink flow; and perform at least one step in the network flow adjustment operations according to a successive sequence of the steps in the network flow adjustment operations.

What is claimed is:

1. A method for adjusting network flow, applied to a server, the method comprising:
   in response to the server meeting a network flow adjustment condition, acquiring network flow-related information of the server;
   determining network flow adjustment operations based on the network flow-related information, wherein the network flow adjustment operations indicate to determine at least one level of downlink flow from a plurality of levels of downlink flows according to an ascending order of the plurality of levels of downlink flows, to perform network flow downregulation on the determined at least one level of downlink flow, the at least one level not comprising a highest level in the plurality of levels, and in any two levels of downlink flows, a value of a downlink flow of a higher level being greater than a value of a downlink flow of a lower lever; and
   performing, according to a sequential order of operations in the network flow adjustment operations, at least one operation in the network flow adjustment operations,
   wherein the determining network flow adjustment operations based on the network flow-related information, comprises:
   in response to the network flow adjustment condition met by the server being that a negative response value to a terminal is increased to a target value, switching a network flow service of the server to a redundant server, wherein the negative response value indicates non-response to a request or a response delay to the request; and
   in response to determining that the network flow service switched to the redundant server does not reach a normal status, determining the network flow adjustment operations based on the network flow-related information.

2. The method according to claim 1, wherein the in response to the server meeting the network flow adjustment condition, comprises:
   determining, in response to determining that there is a future rush network flow period, that the server meets the network flow adjustment condition;
   wherein, the network flow adjustment operations are used to be performed in the future rush network flow period, the network flow-related information comprises a determination factor of the network flow adjustment operations, and the determination factor comprises at least one of: a capacity demand of a network flow and a level of a downlink flow.

3. The method according to claim 1, wherein the network flow-related information comprises service status information;
   the determining network flow adjustment operations based on the network flow-related information, comprises:
   determining, in response to the network flow adjustment condition met by the server being an increase in the negative response value to the terminal, a failure cause corresponding to the service status information; and
   determining the network flow adjustment operations based on the failure cause.

4. The method according to claim 1, wherein the network flow adjustment operations further indicate to adjust a service capacity of more than one level of downlink flow of the server, and the network flow-related information comprises service status information;
the determining the network flow adjustment operations based on the network flow-related information, comprises:
determining, based on the service status information of the server, whether the capacity of the server meets network flow of the server at a target period, wherein the network flow at the target period is a current network flow or network flow in a future rush network flow period; and
in response to determining that the capacity of the server does not meet the network flow of the server at the target period, determining the network flow adjustment operations.

5. The method according to claim 4, wherein the more than one level of network flow comprises the highest level of network flow;
the adjusting the service capacity of more than one level of downlink flow of the server, comprises:
determining, according to a descending order of the plurality of levels of the downlink flows, a first preset number of levels of downlink flows from the plurality of levels of downlink flows to perform service capacity expansion on the determined first preset number of levels of downlink flows, so as to add new operating resource for processing the first preset number of levels of downlink flows, wherein the first preset number is less than or equal to a number of levels in the more than one level.

6. The method according to claim 5, wherein the adjusting the service capacity of more than one level of downlink flow of the server, further comprises:
determining, according to the ascending order of the plurality of levels of the downlink flows, a second preset number of levels of downlink flows from the plurality of levels of downlink flows to perform service capacity shrinkage on the determined second preset number of levels of downlink flows, so as to reduce an operating resource for processing the second preset number of levels of downlink flows.

7. The method according to claim 5, wherein the performing at least one operation in the network flow adjustment operations according to the sequential order of the operations in the network flow adjustment operations, comprises:
performing an operation in the network flow adjustment operations according to the sequential order of the operations in the network flow adjustment operations; and
in response to a negative response value of the new operating resource being increased to the target value, performing a rollback operation corresponding to the operation in the network flow adjustment operations.

8. The method according to claim 1, wherein in the at least one level of downlink flow, each level of downlink flow has a corresponding downregulation range, and a downregulation range of any level of network flow is greater than or equal to a downregulation range of a higher level of network flow.

9. An electronic device, comprising:
one or more processors; and
a storage apparatus, for storing one or more programs,
the one or more programs, when executed by the one or more processors, cause the one or more processors to implement steps, the steps comprising:
in response to a server meeting a network flow adjustment condition, acquiring network flow-related information of the server;
determining network flow adjustment operations based on the network flow-related information, wherein the network flow adjustment operations indicate to determine at least one level of downlink flow from a plurality of levels of downlink flows according to an ascending order of the plurality of levels of downlink flows, to perform network flow downregulation on the determined at least one level of downlink flow, the at least one level not comprising a highest level in the plurality of levels, and in any two levels of downlink flows, a value of a downlink flow of a higher level being greater than a value of a downlink flow of a lower lever; and
performing, according to a sequential order of operations in the network flow adjustment operations, at least one operation in the network flow adjustment operations,
wherein the determining network flow adjustment operations based on the network flow-related information, comprises:
in response to the network flow adjustment condition met by the server being that a negative response value to a terminal is increased to a target value, switching a network flow service of the server to a redundant server, wherein the negative response value indicates non-response to a request or a response delay to the request; and
in response to determining that the network flow service switched to the redundant server does not reach a normal status, determining the network flow adjustment operations based on the network flow-related information.

10. The electronic device according to claim 9, wherein the in response to the server meeting the network flow adjustment condition, comprises:
determining, in response to determining that there is a future rush network flow period, that the server meets the network flow adjustment condition;
wherein, the network flow adjustment operations are used to be performed in the future rush network flow period, the network flow-related information comprises a determination factor of the network flow adjustment operations, and the determination factor comprises at least one of: a capacity demand of a network flow and a level of a downlink flow.

11. The electronic device according to claim 9, wherein the network flow-related information comprises service status information;
the determining network flow adjustment operations based on the network flow-related information, comprises:
determining, in response to the network flow adjustment condition met by the server being an increase in the negative response value to the terminal, a failure cause corresponding to the service status information; and
determining the network flow adjustment operations based on the failure cause.

12. The electronic device according to claim 9, wherein the network flow adjustment operations further indicate to adjust a service capacity of more than one level of downlink flow of the server, and the network flow-related information comprises service status information;
the determining the network flow adjustment operations based on the network flow-related information, comprises:

determining, based on the service status information of the server, whether the capacity of the server meets network flow of the server at a target period, wherein the network flow at the target period is a current network flow or network flow in a future rush network flow period; and in response to determining that the capacity of the server does not meet the network flow of the server at the target period, determining the network flow adjustment operations.

13. The electronic device according to claim 12, wherein the more than one level of network flow comprises the highest level of network flow;

the adjusting the service capacity of more than one level of downlink flow of the server, comprises:

determining, according to a descending order of the plurality of levels of the downlink flows, a first preset number of levels of downlink flows from the plurality of levels of downlink flows to perform service capacity expansion on the determined first preset number of levels of downlink flows, so as to add new operating resource for processing the first preset number of levels of downlink flows, wherein the first preset number is less than or equal to a number of levels in the more than one level.

14. The electronic device according to claim 13, wherein the adjusting the service capacity of more than one level of downlink flow of the server, further comprises:

determining, according to the ascending order of the plurality of levels of the downlink flows, a second preset number of levels of downlink flows from the plurality of levels of downlink flows to perform service capacity shrinkage on the determined second preset number of levels of downlink flows, so as to reduce an operating resource for processing the second preset number of levels of downlink flows.

15. The electronic device according to claim 13, wherein the performing at least one operation in the network flow adjustment operations according to the sequential order of the operations in the network flow adjustment operations, comprises:

performing an operation in the network flow adjustment operations according to the sequential order of the operations in the network flow adjustment operations; and in response to a negative response value of the new operating resource being increased to the target value, performing a rollback operation corresponding to the operation in the network flow adjustment operations.

16. The electronic device according to claim 9, wherein in the at least one level of downlink flow, each level of downlink flow has a corresponding downregulation range, and a downregulation range of any level of network flow is greater than or equal to a downregulation range of a higher level of network flow.

17. A non-transitory computer readable storage medium, storing a computer program thereon, the program, when executed by a processor, causes the processor to implement steps, the steps comprising:

in response to a server meeting a network flow adjustment condition, acquiring network flow-related information of the server;

determining network flow adjustment operations based on the network flow-related information, wherein the network flow adjustment operations indicate to determine at least one level of downlink flow from a plurality of levels of downlink flows according to an ascending order of the plurality of levels of downlink flows, to perform network flow downregulation on the determined at least one level of downlink flow, the at least one level not comprising a highest level in the plurality of levels, and in any two levels of downlink flows, a value of a downlink flow of a higher level being greater than a value of a downlink flow of a lower lever; and performing, according to a sequential order of operations in the network flow adjustment operations, at least one operation in the network flow adjustment operations, wherein the determining network flow adjustment operations based on the network flow-related information, comprises:

in response to the network flow adjustment condition met by the server being that a negative response value to a terminal is increased to a target value, switching a network flow service of the server to a redundant server, wherein the negative response value indicates non-response to a request or a response delay to the request; and in response to determining that the network flow service switched to the redundant server does not reach a normal status, determining the network flow adjustment operations based on the network flow-related information.

\* \* \* \* \*